United States Patent
Chen

(10) Patent No.: US 12,371,821 B2
(45) Date of Patent: Jul. 29, 2025

(54) FABRICATION OF CARBON FIBERS WITH HIGH MECHANICAL PROPERTIES

(71) Applicant: TANGOLD INC., Edmonton (CA)

(72) Inventor: Weixing Chen, Calgary (CA)

(73) Assignee: Thread Innovations Inc., Edmonton (CA)

( * ) Notice: Subject to any disclaimer, the term of this patent is extended or adjusted under 35 U.S.C. 154(b) by 0 days.

(21) Appl. No.: 17/769,279

(22) PCT Filed: Oct. 19, 2020

(86) PCT No.: PCT/CA2020/051403
§ 371 (c)(1),
(2) Date: Apr. 14, 2022

(87) PCT Pub. No.: WO2021/072559
PCT Pub. Date: Apr. 22, 2021

(65) Prior Publication Data
US 2024/0141559 A1    May 2, 2024

Related U.S. Application Data

(60) Provisional application No. 62/925,672, filed on Oct. 24, 2019, provisional application No. 62/916,680, filed on Oct. 17, 2019.

(51) Int. Cl.
| | | |
|---|---|---|
| C10C 3/00 | (2006.01) | |
| C10C 3/02 | (2006.01) | |
| C10C 3/10 | (2006.01) | |
| D01D 1/04 | (2006.01) | |
| D01D 5/08 | (2006.01) | |
| D01D 5/084 | (2006.01) | |
| D01D 7/00 | (2006.01) | |
| D01D 10/02 | (2006.01) | |
| D01F 9/145 | (2006.01) | |
| D01F 9/155 | (2006.01) | |

(52) U.S. Cl.
CPC .............. D01F 9/155 (2013.01); C10C 3/002 (2013.01); D01D 5/084 (2013.01); D01D 7/00 (2013.01); D10B 2101/12 (2013.01)

(58) Field of Classification Search
CPC .. C10C 3/00; C10C 3/002; C10C 3/02; C10C 3/10; D01D 1/04; D01D 5/08; D01D 7/00; D01D 10/02; D01F 9/145; D01F 9/155; D10B 2101/12
USPC .......... 264/29.2, 29.6, 29.7, 211.11, 211.12, 264/211.14, 211.15, 211.17; 423/447.2, 423/447.4, 447.7, 447.8, 448; 208/39, 44
See application file for complete search history.

(56) References Cited

U.S. PATENT DOCUMENTS

| | | | |
|---|---|---|---|
| 3,552,922 A | | 1/1971 | Ishikawa et al. |
| 3,595,946 A | * | 7/1971 | Joo et al. .................. D01F 9/15 |
| | | | 423/447.8 X |
| 3,635,675 A | * | 1/1972 | Ezekiel .................... D01F 9/24 |
| | | | 423/448 X |
| 4,362,646 A | * | 12/1982 | Ikegami ................ C01B 32/382 |
| | | | 423/447.2 |
| 6,241,923 B1 | | 6/2001 | Sakai |
| 6,524,501 B1 | * | 2/2003 | Arai ........................ D01F 9/145 |
| | | | 423/447.7 X |
| 9,580,839 B2 | | 2/2017 | Bohnert et al. |
| 2013/0040520 A1 | | 2/2013 | Bohnert et al. |
| 2013/0058719 A1 | * | 3/2013 | Warlow ............... B01F 27/1145 |
| | | | 404/92 |
| 2014/0175688 A1 | | 6/2014 | Bohnert et al. |
| 2020/0224103 A1 | * | 7/2020 | Corscadden ........... B01D 11/04 |

FOREIGN PATENT DOCUMENTS

| | | |
|---|---|---|
| CA | 3030277 A1 | 7/2020 |
| CN | 105696116 A | 6/2016 |
| CN | 109181732 A | 1/2019 |
| CN | 107988713 B | 6/2020 |
| EP | 0383339 A2 | 8/1990 |
| JP | S58144127 A | 8/1983 |
| JP | S60231825 A | 11/1985 |
| JP | H026619 A | 1/1990 |
| JP | 2780231 B2 | 7/1998 |

OTHER PUBLICATIONS

Natarajanl et al. Preparation of Solid and Hollow Asphaltene Fibers by Single Step Electrospinning, Journal of Engineered Fibers and Fabrics, vol. 6(2)(2011)1-5.
Karimi et al. Quantitative Evidence for Bridged Structures in Asphaltenes by Thin Film Pyrolysis, Energy Fuels 25 (2011) 3581-3589.
Qin et al., "From Coal-Heavy Oil Co-refining Residue to Asphaltene-Based Functional Carbon Materials". ACS Sustainable Chemistry Engineering, Jan. 24, 2019 (Jan. 24, 2019), vol. 7, pp. 4523-4531.
Ni et al., "Nitrogen-doped asphaltene-based porous carbon fibers as supercapacitor electrode material with high specific capacitance". Electrochimica Acta, Nov. 11, 2019 (Nov. 11, 2019), vol. 330, pp. 135270.
Vilaplana-Ortego et al., Stabilization of low softening point petroleum pitch fibres by HNO"3", Carbon, Elsevier Oxford, GB, vol. 41 No 5. Jan. 1, 2003 pp. 1001-1007.
Tsuji, K. Office Action (Oct. 28, 2024) Japan Patent Office Application No. 2022-522818.
Yang, H. Office Action 1 (Aug. 7, 2023) The China National Intellectual Property Administration Application No. 2020800726036.
Yang, H. Office Action 2 (Mar. 16, 2024) The China National Intellectual Property Administration Application No. 2020800726036.
Examination Report 1 (Jun. 2024) Kuwait Patent Office Application No. KW/P/202200452.

(Continued)

*Primary Examiner* — Leo B Tentoni
(74) *Attorney, Agent, or Firm* — Bennett Jones LLP

(57) ABSTRACT

A method of fabricating carbon fibers includes the steps of: (a) melting asphaltene solids in a sealed vessel; (b) spinning melted asphaltenes to fabricate green fibers; (c) stabilizing the green fibers; (d) carbonizing the stabilized green fibers; and (e) optionally graphitizing carbonized fibers.

29 Claims, 6 Drawing Sheets

(56) References Cited

OTHER PUBLICATIONS

Al-Harbi, M. Office Action 1 (Jun. 2023), Saudi Authority for Intellectual Property Application No. 522432272.
Al-Harbi, M. Office Action 2 (2024), Saudi Authority for Intellectual Property Application No. 522432272.
Shegebaeva, G. Inquiry of the Substantive Examination 1 (May 25, 2023) Kazakhstan National Institute of Intellectual Property Application No. 2022/0239.1.
Carvalho Rufino, S. Preliminary Office Action (Sep. 20 2024) Brazilian Patent and Trademark Office Application No. BR1120220072872.
Rodriguez, S. Office Action (Oct. 11, 2024) Columbian Patent Office Application No. NC2022/0006363.
Masson, P. Examination Opinion/Search Report (Mar. 7, 2024) European Patent Office Application No. EP20876769.
Suryani, I. Substantive Examination (May 2024) Directorate General of Intellectual Property Application No. P00202205505.
Migal, S.S. Office Action (May 29, 2023) Eurasian Patent Organization Application No. 202291202.

\* cited by examiner

FABRICATION OF CARBON FIBERS WITH HIGH MECHANICAL PROPERTIES

FIELD OF THE INVENTION

The present invention relates to a method of making carbon fibers.

BACKGROUND OF THE INVENTION

Carbon fibers (CF or graphite fibers), are thread or filament carbonaceous materials with diameters typically about 5-10 μm, and composed mostly of carbon atoms, at least 50 wt. %. Carbon fibers are widely used in aerospace, civil engineering, military, motorsports, and sporting goods because of their many advantages including high stiffness, high tensile strength, low weight, high chemical resistance, high temperature tolerance and low thermal expansion.

Carbon fibers are typically produced using two main methods, either through the use of polyacrylonitrile (PAN) or from pitch. Pitch is the product of distillation of carbon-based materials, such as plants, crude oil and coal. Pitch is isotropic, but can be made anisotropic by heat treatments. However, the most important material in carbon fiber production is mesophase pitch due to the ability to melt spin anisotropic mesophase pitch without filament breakage. The mesophase pitch forms thermotropic crystals, which allow the pitch to become organized and form linear chains without the use of tension.

Mesophase pitch is made by polymerizing isotropic pitch to a higher molecular weight. An advantage in the production of pitch-based carbon fibers over PAN carbon fibers is that pitch carbon fibers do not require constant tension on the fibers at all processing stages.

Pitch-based carbon fibers have been found to be more sheet-like in their crystal structure, as opposed to PAN based carbon fibers, which are more granular. There are six main steps in the production of carbon fibers from pitch: 1) melt spinning, 2) oxidization, 3) carbonization, 4) graphitization, 5) surface treatment and 6) sizing.

Melt spinning is the method of forming fibers through the rapid cooling of a melt. Due to the fast rates of cooling, the mesophase pitch is able to become highly oriented. Mesophase pitch can be melt spun, but because of its flow characteristics the process can be difficult to perform reliably. The viscosity of mesophase pitch is more sensitive to temperature than other melt-spun materials. Therefore, during the creation of pitch-based fibers, the temperature and heat transfer rate must be carefully controlled.

Oxidation is used to cross-link the molecules to the point where the fibers do not melt or fuse together. It is usually performed at about 200° to about 400° C. for several hours in air. This step is extremely important because it produces fibers that are stable at the high temperatures of carbonization and graphitization. Without cross-linking, the fibers would fail in these process steps.

Carbonization is achieved by heating the fibers to high temperatures, typically about 1000° to about 2000° C., in an inert oxygen-free atmosphere. This step removes most of the impurities (e.g., hydrogen, oxygen, nitrogen) from the fibers, leaving mainly crystalline carbon in mostly hexagonal rings.

Graphitization is the process of treating the fibers at high temperatures in order to improve the alignment and orientation of the crystalline regions along the main fiber axes. Having the crystalline regions aligned, stacked, and oriented along the main fiber axis increases the overall strength and stiffness of the carbon fibers. In order to obtain carbon fibers with higher modulus and higher carbon content, graphitization is performed at higher temperatures up to 3000° C.

Surface treatment may be applied to improve the adhesion of carbon fibers to binding matrices for making composite materials. And lastly, sizing for carbon fiber involves coating surface treated carbon fibers with polymers to prevent individual filaments from breaking, to improve handling of the very fine carbon filaments, and to provide compatibility with the molding process.

The high strength of carbon fibers can be attributed to the six main processes above. The high levels of crystalline regions allow the fibers to withstand large stresses. These crystalline regions are formed via the melt spinning process; the crystals are stiff areas that do not deform readily when an external stress is applied.

Asphaltenes are molecular substances that are found in a carbonaceous material such as bitumen or crude oil, or coal, along with resins, aromatic hydrocarbons, and saturates. Asphaltenes have complex molecular structures, including aromatic multicyclic structures surrounded by aliphatic chains and heteroatoms, which are usually insoluble in light n-alkanes (like n-pentane, $nC_5$ or n-heptane, $nC_7$), but soluble in aromatic solvents like toluene. Their molecular masses are usually found in the range of 400 u to 1500 u, although the average and maximum values are difficult to determine due to aggregation of the molecules in solution. Asphaltenes consist primarily of carbon, hydrogen, nitrogen, oxygen, and sulfur, as well as trace amounts of vanadium, nickel and iron. The C:H ratio is approximately 1:1.2, depending on the asphaltene source.

Asphaltenes are a main component in pitch-based precursors for carbon fibers. For example, asphaltenes make up over 80 wt % of total Ashland 260 petroleum pitch, which is a brand name of high-grade pitch precursor for carbon fibers.

Pure asphaltenes are glassy-like solids and can be easily ground into powders at ambient temperatures. No attempts have been made to fabricate carbon fibers from pure solid asphaltenes. It is known to make carbon fibers from asphaltenes obtained from heavy oil upgrading, wherein a room temperature liquid-phase asphaltene stream comprising about 60% to about 70% asphaltenes is introduced through a spinneret to yield carbon-based filaments. In the case of solid asphaltenes are available, a step of dissolving the solid-phase asphaltene stream in a solvent to yield an asphaltene solution is needed before introducing asphaltene-contained liquid phase through a spinneret to yield carbon-based filaments. In the latter case, the solid-phase asphaltene stream, before dissolving into solvent, comprises about 60% to about 90% asphaltenes, based upon a total weight of the solid-phase asphaltene stream taken as 100% by weight.

It is also known to use electrospinning to produce micrometer size fibers, both solid and hollow from asphaltene; however, further processing to achieve high mechanical properties has not been performed. Such treatments are prerequisite steps for carbon fibers to reach necessary mechanical properties for making composite materials. In addition, fibers after electrospinning appear short, bent, hollow and branched. These defects do not meet the basic requirements of carbon fibers for structural applications.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention relates to a method of making carbon-based fibers by melt-spinning of solid asphaltenes, which may preferably be asphaltenes rejected by solvent deasphalting of feedstock bitumen or crude oil. The feedstock may be thermally cracked or non-thermally cracked. The melt-spun carbon-based fibers are then treated to achieve desirable mechanical properties.

In one aspect, the invention comprises a method of producing carbon fibers comprising the steps of:
 (a) melting asphaltene solids by heating in a sealed vessel and pressurizing the vessel using an inert gas;
 b) introducing the melted asphaltenes into a spinneret to yield green fibers;
 c) stabilizing the green fibers with a liquid or a gas to surface pretreat the green fibers to avoid potential fiber fusing during subsequent thermal processing; and
 d) thermally treating the surface-treated green fibers.

In some embodiments, the green fibers may be produced with a desired fiber diameter by controlling pulling speed and diameter of the spinnerets.

Embodiments of the present invention are broadly directed to methods of making carbon fibers directly from asphaltenes solids without the requirement of producing a liquid stream containing asphaltenes and introducing the liquid stream into spinnerets to yield carbon-based fibers. In particular, no solvents to dissolve asphaltenes are required.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. The drawings are not necessarily to scale and in some instances proportions may have been exaggerated in order more clearly to depict certain features. In the drawings.

DETAILED DESCRIPTION

Figure 1:
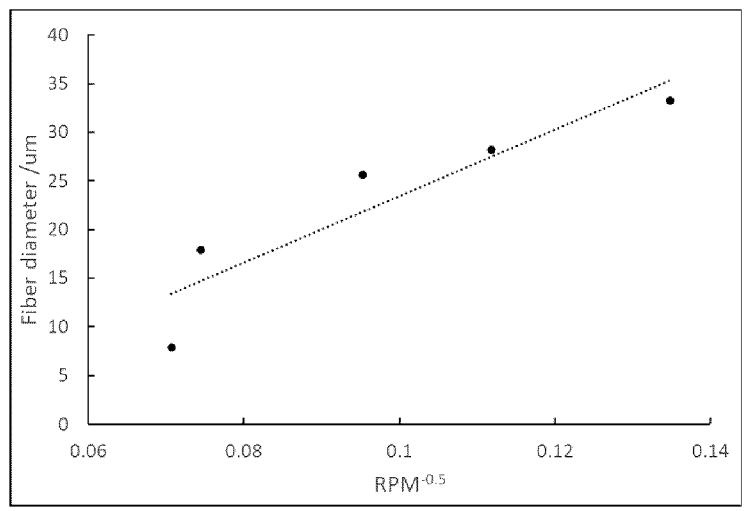
FIG. 1 is a diagram showing the relationship between spool winding speed and filament diameter of raw asphaltene (called green fibers) established using a melt-spinning equipment for fabricating filament of asphaltene.

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated. To the extent that the following description is of a specific embodiment or a particular use of the invention, it is intended to be illustrative only, and not limiting of the claimed invention.

As used herein, "carbon fiber" refers to any thread or filament material comprising at least 50% (mass) elemental carbon with thread or filament diameters less than 0.1 mm, which may be controlled to achieve either higher force or stress to fracture. The term "fiber" may be interchangeably spelled as "fibre".

Asphaltenes solids for fabricating carbon fibers shall refer to the solid precipitates obtained by adding a solvent, such as an n-alkane (like n-pentane, $nC_5$ or n-heptane, $nC_7$) into bitumen or crude oil. This process is known generally as solvent deasphalting by those skilled in the art, is well known and need not be further described. This deasphalting process could be applied directly to bitumen and crude oils, or after some thermal conversion processes or cracking, and results in asphaltene solids insoluble in the solvent chosen.

Asphaltenes have the properties and composition described above, and as well known to those skilled in the art.

The present invention relates to a method of making carbon fibers using solid asphaltenes as carbon precursors. Table 1 provides typical compositions of asphaltene solids from different sources. Embodiments of the methods disclosed herein may be applied to asphaltenes from any sources as long as the asphaltenes are in the solid phase. Preferably, the asphaltenes do not contain any substantial amounts of solid particles with a melting point higher than about 100° C. or with a size larger than about 1 μm. In some preferred embodiments, asphaltene precursors containing relatively less sulfur, oxygen, any metallic species, and fine non-melt particles may be preferred to produce carbon fibers with improved mechanical properties.

TABLE 1

Chemical composition of asphaltenes from various sources

| Sources | C | H | N | S |
|---|---|---|---|---|
| Athabasca (Canada) industrial C5 insolubles | 82.1 | 7.9 | 1.1 | 5.6 |
| Athabasca C5 insolubles | 82 | 7.6 | 1.4 | 7.6 |
| Athabasca C7 insolubles | 81.5 | 7.5 | 1.5 | 8.1 |
| Cold Lake (Canada) C7 insolubles | 77.9 | 7.5 | 1.5 | 8.2 |
| Maya (Mexico) C7 insolubles | 82.1 | 7.7 | 1.4 | 7.4 |
| Safaniya (Saudi Arabia) C7 insolubles | 82.4 | 7.3 | 1.2 | 7.7 |
| Venezuelan C7 insolubles | 81.5 | 7.6 | 2 | 5.6 |

The carbon fibers produced by the methods disclosed herein may achieve high strength. The strength of carbon fibers is very sensitive to the diameter of carbon fibers. The diameter of carbon fibers produced by the methods disclosed herein may be larger than the diameter of prior art, commercially available carbon fibers, which are usually below 10 μm, and mostly in the range of 5 to 7 μm. In contrast, the diameter of carbon fibers produced herein may be in the range of 10 to 16 μm. These fibers may be tested to demonstrate the effect of thermal treatment on mechanical properties of carbon fibers fabricated using pure solid asphaltenes as carbon precursors.

In some embodiments, solid asphaltenes are added to a sealed chamber and then melted under pressure in an inert atmosphere. For example, in one embodiment, the asphaltenes may be melted at about 190° C. and pressurized to between about 0 to about 1000 kPa, preferably between about 200 to about 600 kPa, and more preferably about 400 kPa, using nitrogen gas. A spinneret of a suitable size may be disposed at the bottom of the chamber, for example, a spinneret with a diameter of 150 m may be used. Asphaltene filaments can be pulled out from the spinneret and winded onto a rotating spool, such as a spool having a diameter of 20 cm. The speed of rotation of the spool is preferably adjustable. The diameter of asphaltene filament or green fiber is inversely related to the rotating speed of spool as shown in FIG. 1.

Figure 2:
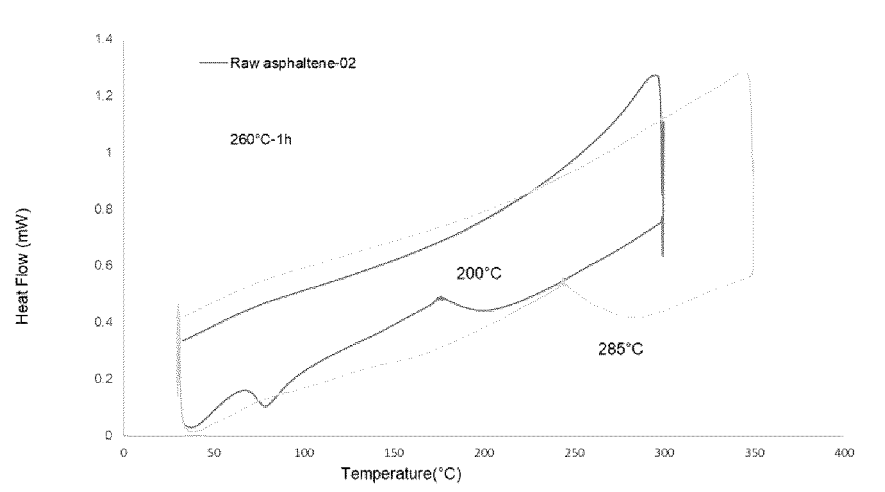
FIG. 2 is a heat flow—temperature diagram of raw asphaltenes with and without thermal treatment at 260° C. for 1 hour in nitrogen.
Figure 3:
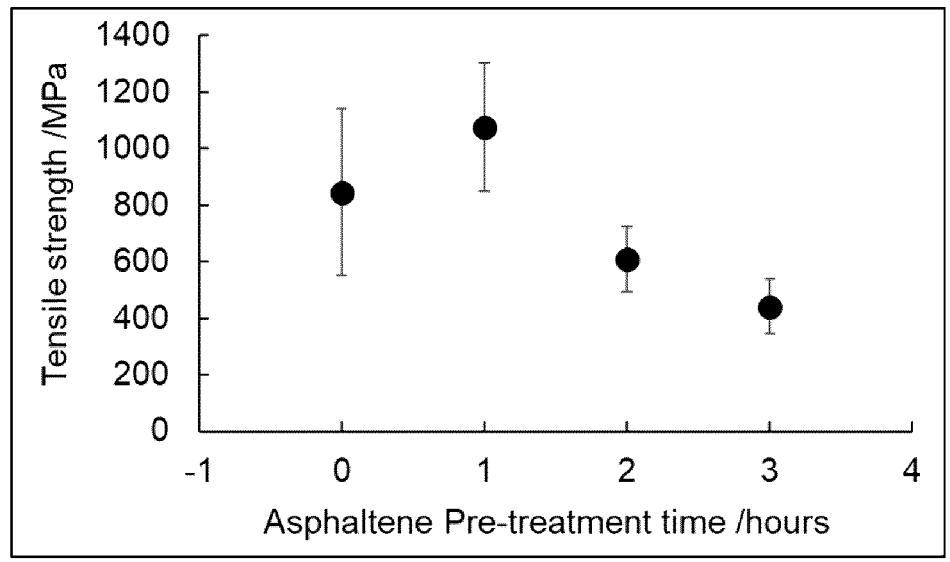
FIG. 3 is a diagram demonstrating the effect of hold time of melt asphaltenes before introducing into spinnerets to yield green fiber on the tensile strength of carbon fibers after being stabilized at 350° C. for 2 hours in air and carbonized at 800° C. in nitrogen for 2 hours.
Figure 4:
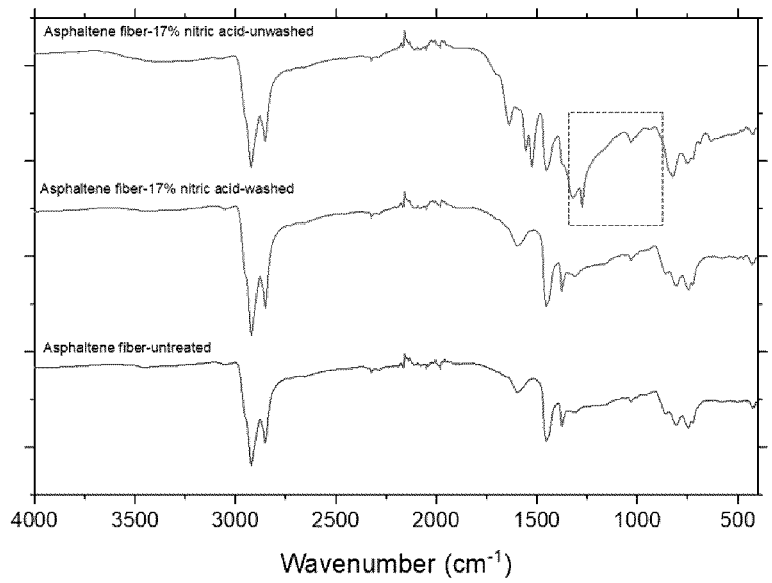
FIG. 4 is a diagram of FTIR-ART (Fourier-transform infrared spectroscopy with Attenuated total reflection accessory) spectra showing the attenuated infrared beam as an interferogram signal after the green fibers were treated by the following processes/steps: Top spectrum: asphaltene-derived green fiber after soaking in 17% nitric acid for 10 minutes, middle spectrum: asphaltene-derived green fiber after soaking in 17% nitric acid for 10 minutes and washing thoroughly in de-ionized water; bottom spectrum: asphaltene-derived green fiber without any treatment.

The appropriate temperature and pressure for melt spinning can be altered by temperature and time the asphaltenes are held in the melt chamber, prior to spinning into carbon fibers. In one embodiment, the bulk asphaltenes may be held at about 260° C. for one hour in nitrogen in the sealed chamber before melt spinning. With such extended heat treatment, the temperature point at which asphaltenes start to soften increases from about 175° C. to about 245° C., as may be seen in FIG. 2.

In one embodiment, the bulk asphaltenes were held at 350° C. for 1, 2 and 3 hours, respectively before melt-spinning, along with a zero control. The obtained asphaltene fiber were subjected to the same post-melt-spinning steps (stabilization and carbonization treatments) performed at 350° C. for 2 hours in air and 800° C. for 2 hours in nitrogen, respectively. The tensile strength of the carbon fibers after all the treatments is found to be the highest when the treatment of bulk asphaltenes at 350° C. was kept for one hour prior to melt-spinning.

Figure 12:
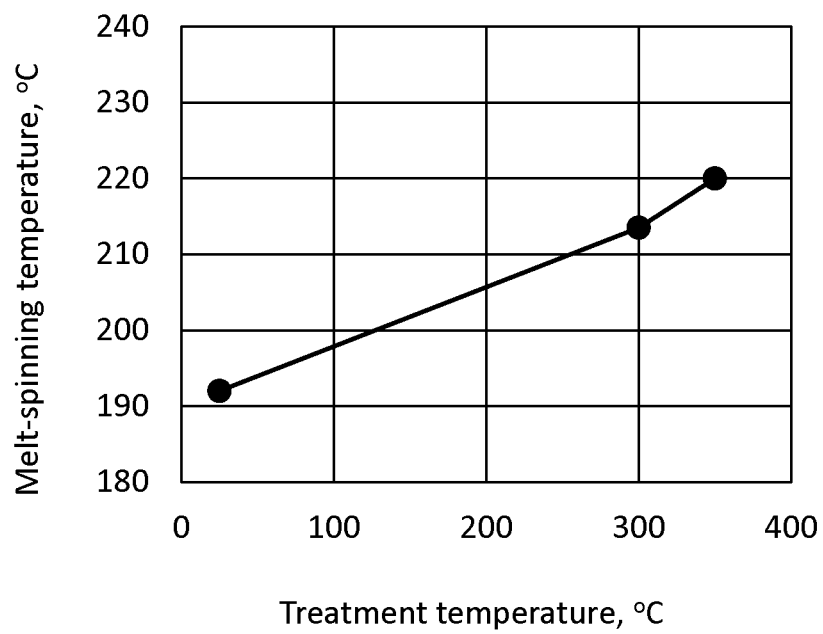
FIG. 12 shows the melt spinning temperature of the same asphaltene feed stock that had been pretreated at different temperatures up to 350° C. for 2 hours in nitrogen environment prior to melting spinning into green fibers. The treatment has increased the temperature of melt-spinning to fabricate green fibers. It should be noted that the feed stock used in this study is different from the feed stock used for the study shown in FIG. 2.

FIG. 12 shows the melt spinning temperature of the same asphaltene feed stock that had been pretreated at different temperatures up to 350° C. for 2 hours in nitrogen environment prior to melting spinning into green fibers. The treatment has increased the temperature of melt-spinning to fabricate green fibers. It should be noted that the feed stock used in this study is different from the feed stock used for the study shown in FIG. 2.

The melt-spun green fibers must be stabilized before carbonization and/or graphitization, such as by surface treating the green fibers with a liquid or a gas. If stabilization treatment were to be performed at a temperature higher than the temperature for melt-spinning asphaltenes into green fibers, fusing of green fibers that are physically in contact to each other may occur during heating the green fiber from ambient temperature to the stabilization temperature.

In some embodiments, the melt-spun green fibers may be soaked in a liquid which coats or interacts with the green fiber surfaces to prevent fusion between adjacent fibers. Suitable liquids include dilute or concentrated mineral acid, such as hydrochloric acid, nitric acid, or sulfuric acid; organic acids such as phytic acid; or solutions of inorganic salts, such as potassium salts, such as potassium nitrate, potassium chloride; or derivatives of any of the foregoing; and/or mixtures thereof. In one preferred embodiment, the green fibers may be soaked in a nitric acid solution (17%) for 10 minutes to prevent the physically contacted green fibers from fusing during heating to a temperature higher than the temperature for melt spinning. Soaking in nitric acid solution attaches chemical species on the surface of green fiber that can prevent green fibers from fusing with adjacent fibers. When green fibers soaked in nitric acid were rinsed into water, the coated chemical species are removed and fusing of physically attached green fibers can occur again during heating to a temperature higher than the temperature used for melt spinning.

Figure 5:
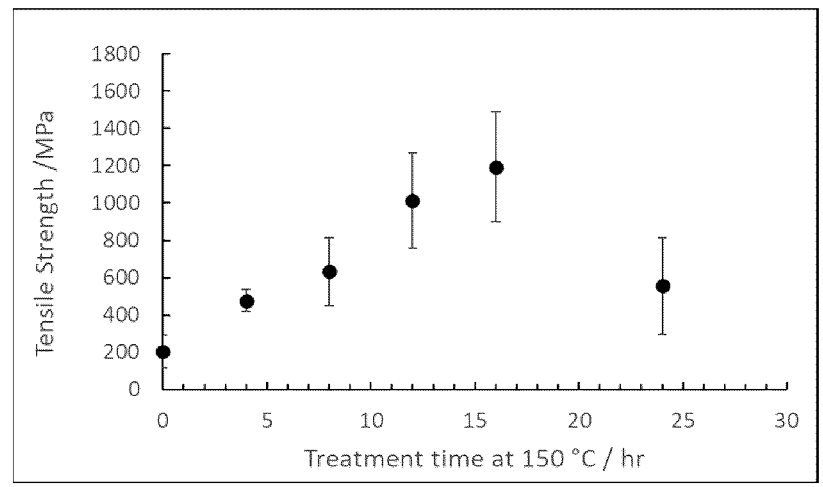
FIG. 5 is a diagram of tensile strength of carbon fibers after stabilization and carbonization treatment performed at 350° C. for 2 hours in air and 800° C. for 2 hours in nitrogen, respectively. The green fibers were pre-treated at 150° C. for various length of time in air before the above indicated stabilization and carbonization treatments were performed.
Figure 6:
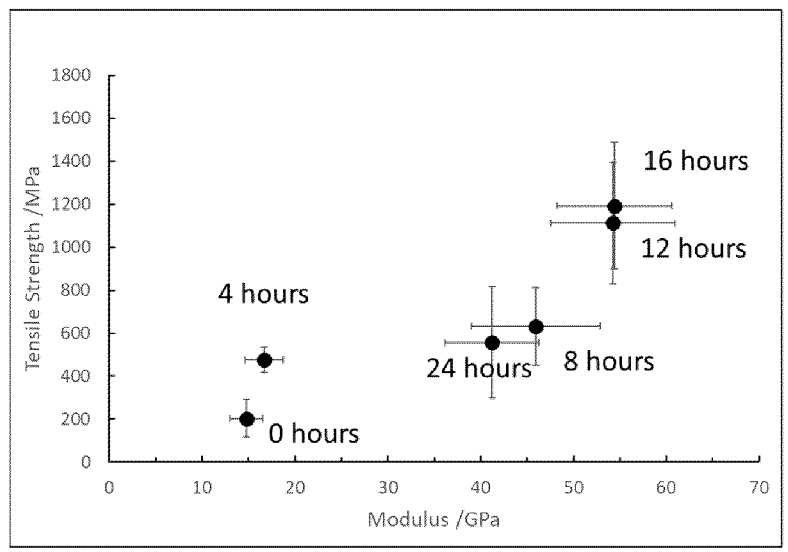
FIG. 6 is a diagram of tensile modulus of carbon fibers after stabilization and carbonization treatment performed at 350° C. for 2 hours in air and 800° C. for 2 hours in nitrogen, respectively. The green fibers were pre-treated at 150° C. for various length of time in air before the above indicated stabilization and carbonization treatments were performed.

In some embodiments, the green fibers may be stabilized or further stabilized in a step-wise temperature scheme in air. In one embodiment, the green fibers may be first soaked in 17% nitric acid for 10 seconds, and stabilized at 150° C. for various lengths of time up to 24 hours in air, preferably at least about 16 hours, followed by a second stabilization treatment at 350° C. for 2 hours. The stabilized fibers are then carbonized at 800° C. for 2 hours. Exemplary results for various treatment times at 150° C. are shown in FIG. 5.

Stabilized green fibers may be carbonized, for example at temperatures ranging from about 400° C. to about 1600° C., preferably in an inert or nitrogen environment. The carbonization step may occur in a single stage, or in multiple stages. For example, three-stage carbonization treatments may be suitable, with a first low-temperature stage at temperatures ranging from 400° C. to 600° C., an intermediate-temperature stage ranging from 600° to about 1200° C. (preferably 800° C. to 1000° C.), and a final high-temperature stage ranging from about 1200° C. to about 1600° C. (preferably about 1500° C.). Each stage may last from minutes to hours, for example, each stage may last between about 1 hour to about 2 hours.

Figure 7:
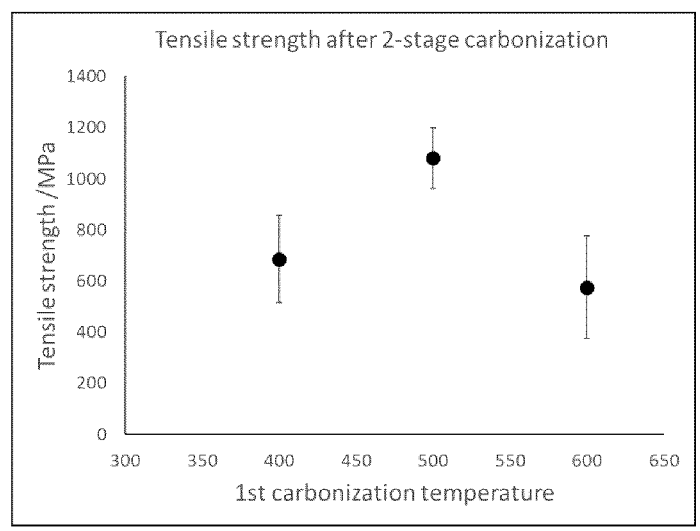
FIG. 7 is diagram of tensile strength of carbon fibers after stabilization treatment at 350° C. for two hours in air and the $1^{st}$ stage carbonation treatment at various temperatures in nitrogen for two hours and the $2^{nd}$ stage carbonization at 800° C. for 2 hours in nitrogen.
Figure 8:
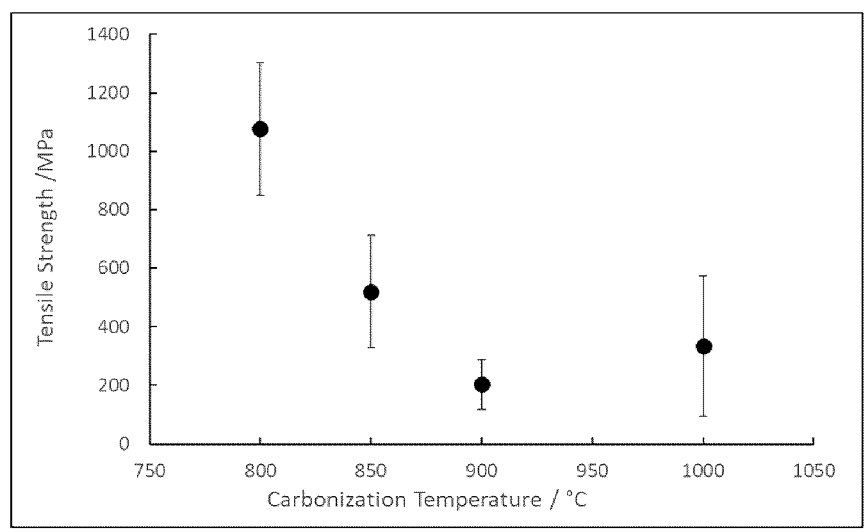
FIG. 8 is a diagram of tensile strength of carbon fibers after stabilization treatment at 350° C. for two hours in air and carbonation treatment at various temperatures for two hours in nitrogen.

In some embodiments, the results of which are shown in FIG. 7, the green fibers were carbonized at a low-temperature stage and an intermediate temperature stage, before tensile testing. The 1$^{st}$ stage carbonization was performed at different temperatures ranging from 400° C. to 600° C. for 2 hours, while the 2$^{nd}$ stage carbonization was carried out at 800° C. for 2 hours. The best tensile strength was achieved when 1$^{st}$ stage carbonization was performed at 500° C. for 2 hours. In other embodiments, the results of which are shown in FIG. 8, the intermediate-temperature carbonization was performed at temperatures ranging from 800° C. to 1000° C. for 2 hours, after a low-temperature carbonization was performed at 500° C. for 2 hours. The lowest tensile strength was observed when intermediate carbonization was performed at 900° C. for 2 hours, while the highest tensile strength was observed when the intermediate carbonization took place at 800° C.

Figure 9:
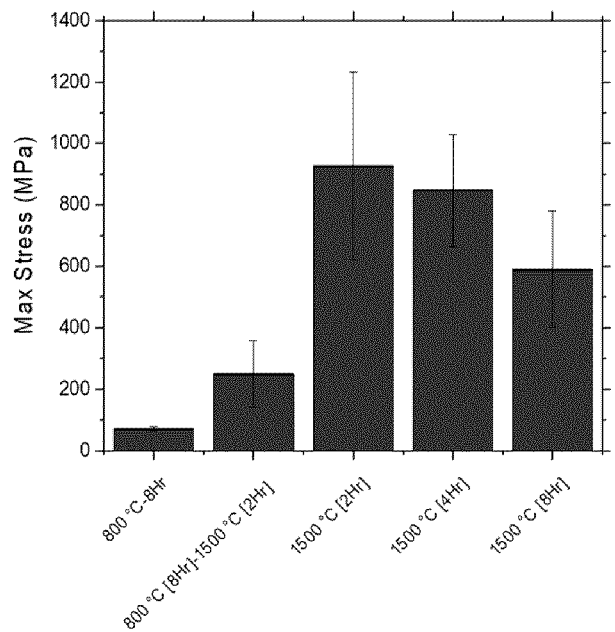
FIG. 9 is a diagram of tensile strength of carbon fibers after stabilization treatment at 350° C. for two hours in air and carbonation treatment at various temperatures in nitrogen for two hours.
Figure 10:
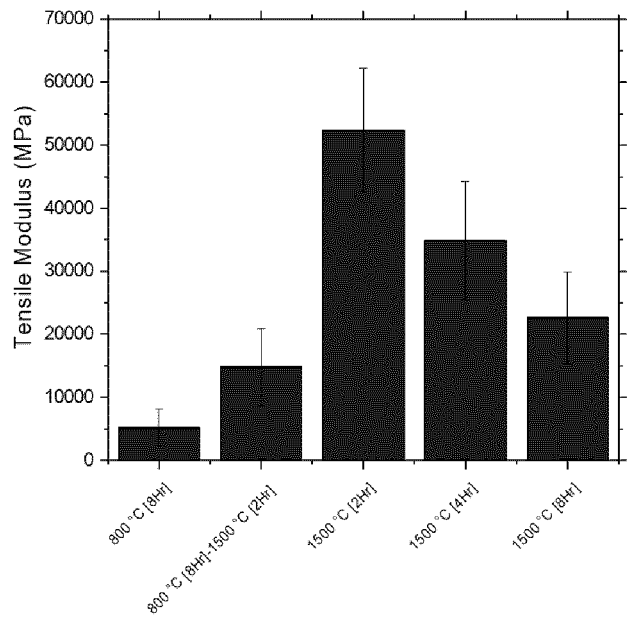
FIG. 10 is a diagram of tensile modulus of carbon fibers after stabilization treatment at 350° C. for two hours in air and carbonation treatment at various temperatures in nitrogen for two hours.

In some embodiments, the results of which are shown in FIGS. 9 and 10, a high temperature carbonization was performed at 1500° C. for various length of time ranging from 2 hours to 8 hours, with and without a prior intermediate temperature stage. The best tensile strength was achieved when carbonization at 1500° C. lasted for 2 hours, without a prior intermediate temperature stage. Increasing carbonization treatment time at 1500° C. for longer than 2 hours reduced tensile strength. When an intermediate temperature carbonization treatment at 800° C. was performed prior to the high temperature treatment at 1500° C., tensile strength was reduced, as compared with the tensile strength obtained when the high temperature carbonization was performed alone.

The lower strength observed when asphaltene-derived carbon fibers were carbonized at around 900° C. is likely caused by the formation of aggregates of metal-containing compounds within the fiber. As may be seen in FIG. 11, after an intermediate temperature carbonization treatment was performed at 800° C. for 8 hours, fractured treated carbon fibers show some aggregates of metal-containing phases with chemical compositions showing in Table 2.

Figure 11:
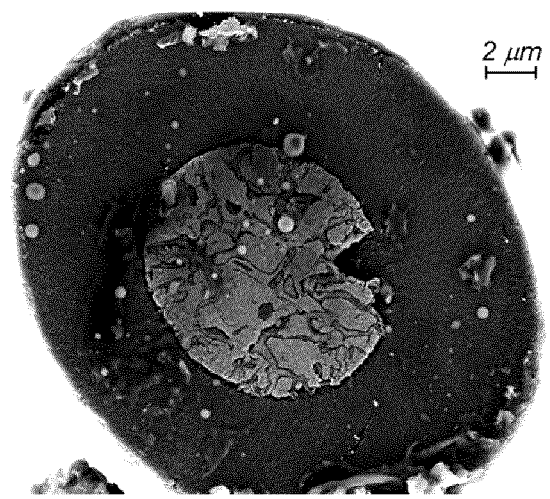
FIG. 11 is an image of fractured cross section of a carbon fiber after carbonization treatment at 800° C. for 8 hours.

Table 2 is a list of chemical composition of the central aggregated showing in FIG. 11.

| Elements | C | Al | S | V | Cr | Fe | Ni | Cu |
|---|---|---|---|---|---|---|---|---|
| 900° C. for 8 hour | 54.29 | 0.25 | 16.16 | 1.81 | 2.04 | 8.98 | 10.93 | 5.53 |

Treatment of green fibers may cause changes of chemistry of carbon fibers. In one embodiment, the composition of carbon, nitrogen, hydrogen, and sulfur was analyzed after varied treatments, and the results shown in Table 3. Generally, carbon content in the carbon fiber increased with increasing treatment temperature and time, while nitrogen, hydrogen, and sulfur content decreased with increasing treatment temperature and time.

Table 3 is a list of chemical composition of asphaltenes and asphaltene-derived carbon fibers after various stage of treatment at different temperatures for different time.

| Sample | Carbon | Nitrogen | Hydrogen | Sulfur |
|---|---|---|---|---|
| Bulk asphaltenes | 82.7 | 1.27 | 7.27 | 7.59 |
| Green fiber | 82.7 | 1.11 | 8.03 | 8.07 |
| Oxidized fiber | 62.4 | 2.27 | 1.84 | 5.99 |
| Carbonized 800° C. - 2 Hr | 81.5 | 1.64 | 0.53 | 6.23 |
| Carbonized 800° C. - 8 Hr | 73.6 | 2.7 | 1.02 | 6.60 |
| Carbonized 1500° C. - 2 Hr | 94.1 | 0.31 | 0.03 | 1.54 |
| Carbonized 1500° C. - 4 Hr | 101.2 | 0.58 | 0 | 0.83 |
| Carbonized 1500° C. - 8 Hr | 97.0 | 0.52 | 0 | 0.61 |

Optionally, the carbon fibers produced may be graphitized. Graphitization is the process of treating the fibers at high temperatures in order to improve the alignment and orientation of the crystalline regions along the main fiber axes. Having the crystalline regions aligned, stacked, and oriented along the main fiber axis increases the overall strength and stiffness of the carbon fibers. In order to obtain carbon fibers with higher modulus and higher carbon content, graphitization is performed at higher temperatures, up to about 3000° C.

In view of the description above, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A method of fabricating carbon fibers, said method comprising the steps of:
(a) melting asphaltene solids in a sealed vessel;
(b) spinning melted asphaltenes to fabricate green fibers;
(c) stabilizing the green fibers in a liquid environment or a gaseous environment;
(d) carbonizing the stabilized green fibers; and
(e) optionally graphitizing carbonized fibers.

Aspect 2: The method of claim 1 wherein the green fibers are stabilized in air or steam.

Aspect 3: The method of Aspect 1 or 2, wherein the asphaltene solids are melted in step (a) between about 150° C. and about 550° C. in an environment such as nitrogen, hydrogen, or steam, or mixtures thereof.

Aspect 4: The method of any one of Aspect 1 to 3, wherein step (a) extends up to about 6 hours.

Aspect 5: The method of Aspect 4 wherein step (a) extends between 0.5 hours to 2 hours.

Aspect 6: The method of any one of Aspect 1 to 5, wherein in step (a) the sealed vessel is pressurized during heating to a level between zero and about 1000 kPa.

Aspect 7: The method of any one of Aspect 1 to 6, wherein the spinning step comprises pulling melted asphaltenes through a spinneret to produce the green fibers, and winding the green fibers onto a rotating spool.

Aspect 8: The method of Aspect 7, wherein the temperature of asphaltenes at time of spinning be controlled between about 150° C. to about 350° C.

Aspect 9: The method of Aspect 7 or 8, wherein the pressure of sealed vessel at time of spinning be controlled between about 100 kPa to about 1000 kPa, preferentially between about 200 kPa to about 700 kPa.

Aspect 10: The method of Aspect 7, 8 or 9, wherein the speed of rotating spool is controlled to achieve a rate of fiber pulling between 50 and 1000 meters per minute, preferentially between 100 and 300 meters per minute.

Aspect 11: The method of any one of Aspect 7 to 10 wherein the diameter of spinneret is selected to a size ranging from about 50 to about 300 μm, preferentially between about 100 to about 200 μm.

Aspect 12: The method of any one of Aspect 1 to 11, wherein the diameter of green fibers is fabricated to a size ranging from about 1 to about 15 μm, preferentially between about 7 to about 10 μm.

Aspect 13: The method of any one of Aspect 1-12 wherein the green fibers are stabilized by soaking in an aqueous solution which coats the green fibers and prevents cohesion between adjacent green fibers.

Aspect 14: The method of Aspect 13, wherein the aqueous solution comprises hydrochloric acid, nitric acid, sulfuric acid, phytic acid, potassium nitrate, potassium chloride, their derivatives, and/or mixtures thereof.

Aspect 15: The method of Aspect 13 or 14, wherein the aqueous solution can be concentrated or dilute, a dilution can be in the range of 1 wt. % to 100 wt % of concentrated solution.

Aspect 16: The method of Aspect 13, 14 or 15, wherein the soaking time is from 1 second to 100 minutes, preferentially from 5 seconds to 50 minutes.

Aspect 17: The method of any one of Aspect 1-16 wherein the stabilizing step comprises at least one stage of heat treatment at temperatures between 100° C. and 400° C. in an air or steam environment.

Aspect 18: The method of Aspect 17, wherein the stabilizing step comprises at least two stages of temperature steps, such as 2 to 5 stages, preferentially 2 to 3 stages.

Aspect 19: The method of Aspect 17 or 18, wherein each temperature stage lasts from about 0.5 hours to about 24 hours.

Aspect 20: The method of any one of Aspect 1-19 wherein the carbonizing step comprises at least one stage of heat treatment at a temperature between about 400° C. and about 1600° C. in an inert environment such as nitrogen gas.

Aspect 21: The method of Aspect 20 wherein the at least one stage of heat treatment comprises at least a low-temperature stage and a high-temperature stage.

Aspect 22: The method of Aspect 20 or 21, wherein a low-temperature stage is performed between about 400° C. and about 600° C. for a period of about 0.5 to about 3 hours.

Aspect 23: The method of Aspect 21 or 22 further comprising and intermediate-temperature stage, which is performed at temperatures between about 700° C. and about 900° C., for a period of about 0.5 to about 10 hours, preferentially for about 1 to about 3 hours.

Aspect 24: The method of any one of Aspect 21 to 23, wherein the high-temperature stage is performed at temperature between about 1300° C. and about 1600° C. for a period of 0.5 to 10 hours.

Aspect 25: The method of Aspect 20, wherein the heat treatment stage comprises an intermediate-temperature stage, without a low-temperature or a high-temperature stage.

Aspect 26: The method of Aspect 20, wherein the heat treatment stage comprises an high-temperature stage, without a low-temperature or a intermediate-temperature stage.

Aspect 27: The method of any one of Aspect 1-26, wherein the diameter of carbon fibers after final treatment is controlled in a range of about 5 to about 10 µm.

Aspect 28: The method of any one of Aspect 1-27, wherein solid asphaltenes are processed to reduce or change the content of sulfur, oxygen, metallic species, particular molecular species or groups, prior to melt-spinning.

Aspect 29: The method of any one of Aspect 1-28, wherein solid asphaltenes may be added with other chemicals or thermally processed to alter the temperature for melting spinning, to change the chemistry of asphaltenes, to increase the content of mesophase, and/or to change the viscosity of melt asphaltenes.

Aspect 30: The method of any one of Aspects 1-29, as modified or added to by any step, feature or element described in this specification.

Aspect 31: A carbon fiber resulting from the method of any one of Aspects 1 to 30.

Definitions and Interpretation

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited, and such terms refer to ranges that can be subsequently broken down into sub-ranges as discussed above. In the same manner, all ratios recited herein also include all sub-ratios falling within the broader ratio.

REFERENCES

The following references and any publications referred to within are indicative of the level of skill in the art, and are wholly incorporated herein by reference, where permitted.

[1] Peter Morgan in Carbon Fibers and Their Composites, 1st Edition, CRC Press, Published May 20, 2005, ISBN 9780824709839-CAT #DK2300, Series: Materials Engineering, page 157.

[2] Methods of making carbon fiber from asphaltenes (US 2014/0175688 A1) filed on Dec. 26, 2012.

[3] Anand Natarajanl, Sharath C. Mahavadi, Tirupattur S. Natarajan, Jacob H. Masliyahl, Zhenghe Xu, Preparation of Solid and Hollow Asphaltene Fibers by Single Step Electrospinning, *Journal of Engineered Fibers and Fabrics*, Volume 6(2)(2011)1-5].

[4] George Bohnert, James Lula, Daniel E. Bowen, Carbonized asphaltene-based carbon-carbon fiber composites, US patent #: US 2013/0040520 A1, Feb. 14, 2013.

[5] Arash Karimi, Kuangnan Qian, William N. Olmstead, Howard Freund, Cathleen Yung, and Murray R. Gray, Quantitative Evidence for Bridged Structures in Asphaltenes by Thin Film Pyrolysis, *Energy Fuels* 25 (2011) 3581-3589

[6] U.S. Pat. No. 9,580,839 "Methods of making carbon fiber from asphaltenes"

The invention claimed is:

1. A method of fabricating carbon fibers, said method comprising the steps of:
   (a) melting asphaltene solids in a sealed vessel pressurized during heating to a level between zero and about 1000 kPa;
   (b) spinning melted asphaltenes to fabricate green fibers;
   (c) stabilizing the green fibers in a liquid environment or a gaseous environment; and
   (d) carbonizing the stabilized green fibers.

2. The method of claim 1 wherein the green fibers are stabilized in air or steam.

3. The method of claim 1, wherein the asphaltene solids are melted in step (a) between about 150° C. and about 550° C. in an environment comprising nitrogen, hydrogen, or steam, or mixtures thereof.

4. The method of claim 1, wherein step (a) extends up to about 6 hours.

5. The method of claim 4 wherein step (a) extends between 0.5 hours to 2 hours.

6. The method of claim 1, wherein the spinning step comprises pulling melted asphaltenes through a spinneret to produce the green fibers, and winding the green fibers onto a rotating spool.

7. The method of claim 6, wherein the temperature of asphaltenes at time of spinning be controlled between about 150° C. to about 350° C.

8. The method of claim 1, wherein the pressure of the sealed vessel at time of spinning is between about 100 kPa to about 1000 kPa.

9. The method of claim 1, wherein the rotating spool is rotated at a speed to achieve a rate of fiber pulling between 50 and 1000 meters per minute, preferentially between 100 and 300 meters per minute.

10. The method of claim 6 wherein the diameter of spinneret is selected to a size ranging from about 50 to about 300 μm.

11. The method of claim 1, wherein the green fibers have a diameter ranging from about 7 to about 10 μm.

12. The method of claim 1 wherein the green fibers are stabilized by soaking in an aqueous solution which coats the green fibers and prevents cohesion between adjacent green fibers.

13. The method of claim 12, wherein the aqueous solution comprises hydrochloric acid, nitric acid, sulfuric acid, phytic acid, potassium nitrate, potassium chloride, their derivatives, and/or mixtures thereof.

14. The method of claim 12, wherein the aqueous solution is either concentrated or a dilution in the range of 1 wt. % to 100 wt. % of concentrated solution.

15. The method of claim 12, wherein the green fibers are soaked for a period of time from 5 seconds to 50 minutes.

16. The method of claim 1 wherein the stabilizing step comprises at least one stage of heat treatment at temperatures between 100° C. and 400° C. in an air or steam environment.

17. The method of claim 16, wherein the stabilizing step comprises at least two stages of temperature steps.

18. The method of claim 16, wherein each temperature stage lasts from 0.5 hours to 24 hours.

19. The method of claim 1 wherein the carbonizing step comprises at least one stage of heat treatment at a temperature between about 400° C. and about 1600° C. in an inert environment.

20. The method of claim 19 wherein the at least one stage of heat treatment comprises at least a low-temperature stage and a high-temperature stage.

21. The method of claim 19, wherein a low-temperature stage is performed between about 400° C. and about 600° C. for a period of about 0.5 to about 3 hours.

22. The method of claim 20 further comprising an intermediate-temperature stage, which is performed at temperatures between about 700°° C. and about 900° C., for a period of about 0.5 to about 10 hours.

23. The method of any one of claim 20, wherein the high-temperature stage is performed at temperature between about 1300° C. and about 1600° C. for a period of 0.5 to 10 hours.

24. The method of claim 19, wherein the heat treatment stage comprises an intermediate-temperature stage, without a low-temperature or a high-temperature stage.

25. The method of claim 19, wherein the heat treatment stage comprises an high-temperature stage, without a low-temperature or an intermediate-temperature stage.

26. The method of claim 1, wherein the carbon fibers have a diameter after final treatment in a range of about 5 to about 10 μm.

27. The method of claim 1, wherein solid asphaltenes are processed to reduce or change the content of sulfur, oxygen, or metallic species, prior to melt-spinning.

28. The method of claim 1, wherein solid asphaltenes are mixed with a chemical additive or thermally processed to alter the temperature for melting spinning, to change the chemistry of asphaltenes, to increase the content of mesophase, and/or to change the viscosity of melt asphaltenes.

29. The method of claim 1, comprising the further step of graphitizing the carbonized fibers.

* * * * *